US011543856B1

(12) United States Patent
Parsian et al.

(10) Patent No.: US 11,543,856 B1
(45) Date of Patent: Jan. 3, 2023

(54) MODULAR ELECTRONIC DEVICE SYSTEM

(71) Applicant: Apple Inc., Cupertino, CA (US)

(72) Inventors: Mohammadali Parsian, San Mateo, CA (US); J. Gerson Goldberg, Menlo Park, CA (US); Nicolas Huynh, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/364,253

(22) Filed: Jun. 30, 2021

(51) Int. Cl.
*G06F 1/16* (2006.01)
*H01R 13/627* (2006.01)
*H01R 13/62* (2006.01)

(52) U.S. Cl.
CPC .......... *G06F 1/1632* (2013.01); *G06F 1/1626* (2013.01); *H01R 13/6205* (2013.01); *H01R 13/6272* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,978,949 | A * | 12/1990 | Herron | G06F 1/166 361/679.21 |
| 7,298,611 | B1 * | 11/2007 | Carnevali | G06F 1/1632 361/679.55 |
| 7,921,997 | B2 * | 4/2011 | Burns | G06F 1/1601 361/679.01 |
| 9,727,085 | B2 * | 8/2017 | Weldon | E05B 73/0082 |
| 9,735,595 | B2 | 8/2017 | Colahan et al. | |
| 9,760,116 | B2 * | 9/2017 | Wylie | G06F 1/1654 |
| 9,774,135 | B2 * | 9/2017 | Laine | G06F 1/1632 |
| 9,847,002 | B2 * | 12/2017 | Kiani | A61B 5/02055 |
| 10,503,208 | B2 * | 12/2019 | Weldon | E05B 73/0082 |
| 10,943,450 | B2 * | 3/2021 | Kiani | A61B 5/6898 |
| 2006/0221565 | A1 * | 10/2006 | Doherty | G06F 1/1632 361/679.55 |
| 2013/0107126 | A1 * | 5/2013 | Nonomura | H04N 5/64 361/679.41 |
| 2014/0049904 | A1 * | 2/2014 | Hume | G06F 1/1632 29/874 |
| 2015/0022966 | A1 * | 1/2015 | Chen | H01R 25/006 361/679.41 |
| 2018/0032104 | A1 | 2/2018 | Schatz et al. | |
| 2018/0122201 | A1 | 5/2018 | Chiang | |
| 2019/0325722 | A1 * | 10/2019 | Kiani | A61B 5/1455 |
| 2021/0081001 | A1 * | 3/2021 | Huang | G06F 1/1626 |

* cited by examiner

*Primary Examiner* — Lisa Lea-Edmonds
(74) *Attorney, Agent, or Firm* — Dorsey & Whitney LLP

(57) ABSTRACT

A modular electronic device system includes an electronic device and a cover for the device that allows the device to be mechanically and electrically mounted to a stand or device adapter on the rear side of the cover. The cover or device adapter can be connectable to modularly attachable and removable accessory devices and can provide electrical ports for powering and operating the accessory devices. While mounted to a stand, power and data communications can be provided to the electronic device, cover, and accessory devices from the stand or an external source. The modular components of the system can be interchangeable to allow the system to be adapted to many different settings and use cases based on the types of components included as the accessory devices and based on the number of accessory devices used.

20 Claims, 6 Drawing Sheets

MODULAR ELECTRONIC DEVICE SYSTEM

FIELD

The described embodiments relate generally to electronic accessories and covers for computing devices. More particularly, the present embodiments relate to a modular expansion hub and related system for attaching accessories to a computing device or for mounting the computing device to a stand.

BACKGROUND

Portable computing devices have grown in popularity and ubiquity worldwide in recent years. Users of these devices have found applications for many different types of work and in settings in nearly all parts of life. In some ways, these devices have been used to replace or improve other devices, such as flashlights, cash registers, lab equipment, scientific instruments, cameras, and other electronic devices. The convenience and adaptability of portable computing devices such as tablet computers and smart phones have therefore helped serve many needs of users for many purposes.

Such portable computing devices often have batteries that need to be regularly charged between uses. Thus, although the devices can provide great benefits in remote areas and when used in mobile applications, they also frequently need to be connected to power to restore charge. In these times, users often find it difficult to quickly and easily control the charging of the device while still operating the device, particularly in settings where the portable computing devices are under heavy duty loads and operating cycles.

Although the computing devices can be very effective on their own, it is also common to use a case or cover on the computing device to protect it from bumps, drops, scrapes, scratches, and other damage. The presence of a cover can make the mounting and securement of a computing device or a charger complex, unreliable, slow, or otherwise challenging. These covers also similarly inhibit the usage of electronic accessories that are connected to the computing device due to interference from the cover or an undesirable connection to the computing device. There is a constant need for improvements in portable computing devices, covers, and related parts of these systems.

SUMMARY

An aspect of the present disclosure relates to an expansion hub for a portable electronic device, wherein the expansion hub includes a housing having a rear side, a first electrical connector to connect to an electronic device, a second electrical connector on the rear side of the housing and configured to mate to a third electrical connector in a rear direction relative to the housing, with the second electrical connector being in electrical communication with the first electrical connector, and a mounting connector to mate the housing to a second mounting connector positioned external to the rear side of the housing in response to movement of the housing in the rear direction. With the mounting connector mated to the second mounting connector, the second electrical connector can be in electrical communication with the third electrical connector.

In some embodiments, the expansion hub housing can be configured to enclose a rear surface of the electronic device, the first electrical connector is configured to engage the electronic device in a direction perpendicular to the rear direction, the mounting connector is configured to mate to the second mounting connector using a biased latch, and the second electrical connector is configured to mate to the third electrical connector using at least one biased member.

In some embodiments, the housing can be positioned in a cover configured to enclose a rear side of the electronic device. The cover can include a rear casing and a front casing, with the housing being positioned between the rear and front casings. The housing can be reversibly removable from the cover. The mounting connector can include a magnetic component to magnetically attract the mounting connector to the second mounting connector.

In some embodiments, the expansion hub can further include a device hub and an accessory electrical connector, wherein the first, second, and accessory electrical connector can be configured for electrical communication with each other by the device hub. In some embodiments, the accessory electrical connector can be positioned peripherally external to the housing. The expansion hub can also further include an accessory device movable relative to the accessory electrical connector between a first position electrically connected to the accessory electrical connector and a second position electrically disconnected from the accessory electrical connector. Furthermore, the first electrical connector can be configured to connect to the electronic device along a direction perpendicular to the rear direction.

Another aspect of the disclosure relates to a modular electronic device system including a case for an electronic device, with the case including a first case electrical connector to engage an electrical contact of the electronic device, a second case electrical connector facing a rear direction from the case and in electrical communication with the first case electrical connector, a third case electrical connector in electrical communication with the second case electrical connector, a first case latching portion, and a second case latching portion. The system can also include a support base including an arm portion having an arm latching portion releasably connectable to the first case latching portion, a first base electrical connector to connect to a power source, and a second base electrical connector positioned on the arm portion and in electrical communication with the first base electrical connector. The system can also include an accessory device including an accessory latching portion releasably connectable to the second case latching portion, and an electronic component configured to electrically connect to the third case electrical connector.

In some embodiments, the system can further include a device adapter including a housing having a front side and a rear side, a first adapter electrical connector on the front side and configured to electrically engage the second case electrical connector, a second adapter electrical connector on the rear side and configured to electrically engage the second base electrical connector, and an accessory port for providing electrical communication with at least one of the first and second adapter electrical connectors. The device adapter can be positionable between the case and the support base with the first adapter electrical connector electrically engaging the second case electrical connector and with the second adapter electrical connector electrically engaging the second base electrical connector.

The first case latching portion can be configured to blind-mate with the arm latching portion by movement of the first case latching portion parallel to the rear direction. In some embodiments, the system can further include a sensor to detect attachment of the case to the support base. The first case latching portion and the arm latching portion can be adjustable between a locked state and an unlocked state, wherein in the locked state, the case is locked to the arm portion, and wherein in the unlocked state, the case is suspended by the arm portion with the rear direction being substantially horizontal.

Yet another aspect of the disclosure relates to a tablet computing system including a computing device having a touchscreen interface positioned in a housing and having an input port, a cover configured to enclose at least a rear surface of the housing, and a hub positioned in the cover. The hub can include a first electrical connector connected to the input port of the computing device and a second electrical connector exposed at an edge of the cover, wherein an accessory device is electrically connectable to the input port via contact with the second electrical connector.

In some embodiments, the system can further include a mechanical connection interface at the second electrical connector, with the mechanical connection interface being attachable to the accessory device. The second electrical connector can be configured to provide power to the accessory device. The cover further can include a panel positioned between the computing device and the hub.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
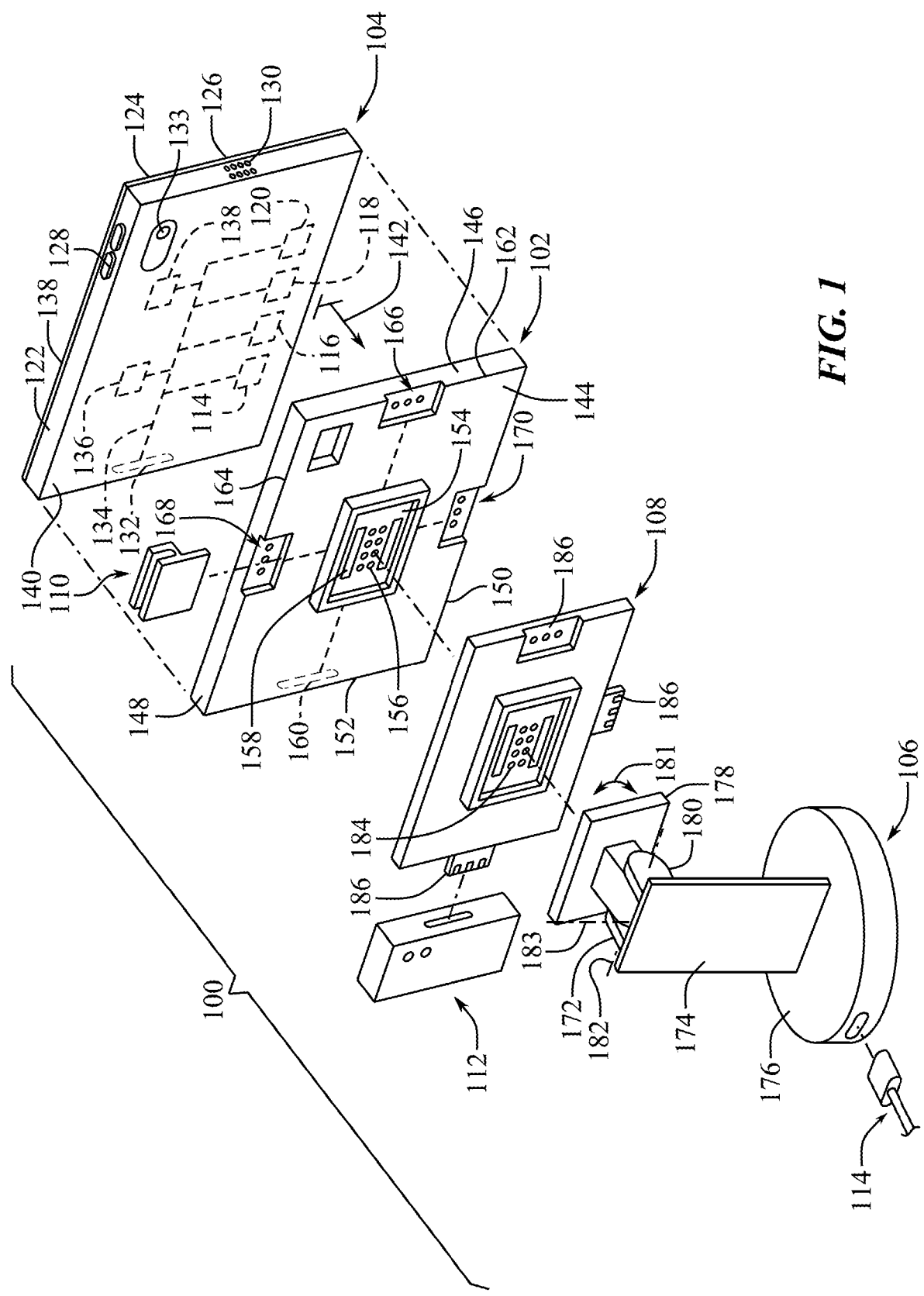
FIG. 1 shows an exploded perspective view of a modular electronic device system.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to modular electronic device systems that can enable smoother and more intuitive, seamless, durable, and adaptable interfacing between a portable computing device and a cover, a stand, an expansion device hub, and accessories mountable to the computing device or to the cover. In example embodiment, the modular electronic device system can include a case or cover for electronic device, wherein the case includes an electrical connector to engage in electrical contact with the electronic device, an electrical connector facing in a rear direction from the case (i.e., facing in a direction perpendicular to the rear surface of the case or perpendicular to a rear surface of the electronic device), and latching portions on the case for attaching the case to a support base arm or to an accessory device.

The support base can be releasably connectable to the latching portion of the case and can provide an electrical connection to a power source, such as a power source used to charge the electronic device through the electrical connectors embedded or held by the case. An accessory device can include a latching portion that is releasably connectable to a latching portion of the case and can electronically connected to an electrical connector on the case.

In some embodiments, the electronic device can be protected by case while being easily attachable and detachable from the support base and the accessory device without having to remove the electronic device from the case and without having to connect and disconnect sensitive plugs at a side or end portion of the electronic device. Thus, with an electrical connector on the case and facing in rear direction, the case can be mounted to the support base with the arm latching portion facing the rear-facing electrical connector on the case. This orientation allows a user to make a pushing motion to attach the case to the support base arm for easy mounting. In other words, the user can hold the electronic device with the front of the user interface facing the user's face, and, while in that orientation, can move the electronic device in a rear direction to latch to the mount of the arm without having to look behind the electronic device or case. Additionally, the stand latching portion of the case can support the case at the center of the rear of the case so that the case and any electronic device within it will be balanced as it is supported by the arm/stand.

Accessory devices can be modularly attached and detached from the case and, simultaneously, attached and detached from electrical communication with electrical connectors extending through the case so that power and information can be exchanged between the accessory device and electronic device positioned in the case. Accessory devices can include devices such as credit card readers, light sensors, antennas, laser scanners, oxygen sensors, air sensors, printers, related devices, and combinations thereof.

Another aspect of the disclosure relates to an expansion hub for portable electronic device, wherein the expansion hub includes a housing with a rear side, a first electrical connector to connect to the electronic device, and a second electrical connector on the rear side of the housing and configured to mate or mount to a third electrical connector in a rear direction relative to the housing. The second electrical connector can be in electrical communication with the first electrical connector. The hub can also include a mounting connector to blindly mate the housing to a second mounting connector positioned external to the rear side of the housing in response to movement of the housing in the rear direction.

With the mounting connector mated to the second mounting connector, the second electrical connector can be in electrical communication with a third electrical connector. The expansion hub can therefore provide electrical connection to an electronic device and an electrical connection to an external (i.e., third) electrical connector that is to the rear of the housing of the hub. For example, the first electrical connector can plug into or otherwise connect to an electrical interface of the portable electronic device, and the second electrical connector can plug into or otherwise connect to an electrical interface of the separate device, such as a stand, accessory, or additional expansion hub.

The rear positioning of the second electrical connector can allow the expansion hub to be moved in a rearward direction as it establishes a connection to the separate device. In this way, a person using the expansion hub can make the electrical connection to the separate device without having to look at the connector as it mounts to the separate device. Furthermore, with the expansion hub integrated into a case or cover for the portable electronic device, the user can hold the sides of the electronic device or cover and move the electronic device in a rear direction (i.e., along a direction extending perpendicular to the rear side of the device or hub) to mount the electronic device and cover to the separate device. While the electronic device and cover are moved in this manner, the mounting connector of the expansion hub can "blindly mate" with the second mounting connector, wherein mechanically latching, magnetically engaging, or otherwise securing or locking parts on the separate device and the expansion of engage with each other, interlock with each other, or provide an attractive force to each other while the user is positioned on the front side of the device and the connectors on the rear side are not visible to the user (i.e., the user is visually "blind" to their mating). In some configurations, the expansion hub can have a mounting connector that mates with the second mounting connector using a biased latch system, and the second electrical connector can meet with the third electrical connector using an interface including at least one biased pin (e.g., a pogo pin) or other biased member or electrical conductor. The biased latch system can have a feature that prevents the electronic device and cover from unintentionally falling off of the stand when the latch is initially unlocked.

Modular systems such as those disclosed herein can take on a wide array of different configurations based on which modules are connected to the system at a given time. For example, the system can include an electronic device, a case, an accessory hub or device adapter, a stand, and one or more accessory devices. In another example, the system can include the electronic device, a case, and the stand. In another example, the system can include electronic device, a case, and the accessory hub. The one or more accessories can be added as a supplement to other components to provide different types of expansion via new sensors, batteries, storage devices, and other useful components. The electronic device and case can be used while mounted to the stand directly or while the device adapter is positioned between the case and the stand, and, in either situation, power or data can be exchanged between the electronic device, the stand, and/or accessories connected to the case, electronic device, or device adapter. Thus, the modular system can be used while mounted to a stand or while disconnected from and separated from the stand.

These and other embodiments are discussed below with reference to the figures. However, those skilled in the art will readily appreciate that the detailed description given herein with respect to these Figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 illustrates an exploded view of an embodiment of a modular electronic device system 100. The system 100 can include a cover 102 for an electronic device 104. The cover 102 can be mountable to a stand 106 or to a device adapter 108 (i.e., an expansion hub or modular accessory hub) that is also mountable to the stand 106. The cover 102 can be attachable and electrically connectable to an accessory device 110 (e.g., a card reader), and the device adapter 108 can be attachable and electrically connectable to a second accessory device 112. The stand 106 can be attachable and electrically connectable to an additional electronic component 114. The devices shown in the system 100 can be connected and used in various different collections and combinations. See, e.g., FIGS. 5A-5E and their related descriptions herein. Thus, in some embodiments, the system 100 can include a cover 102, electronic device 104, and an accessory device 110. In another embodiment, the system 100 can include the cover 102, electronic device 104, and stand 106. Similarly, the system 100 can include the cover 102, electronic device 104, stand 106, and device adapter 108. The system 100 can alternatively include the cover 102, electronic device 104, and device adapter 108 (and, optionally, accessory device 110 and/or 112).

The electronic device 104 can be a computing device, such as, for example, a tablet computer, a smart phone, an all-in-one computer, a remote terminal, a remote control, similar devices, and combinations thereof. The electronic device 104 can be an independently operable device, wherein a user can interact with a display and input devices of the electronic device 104 while the electronic device 104 is separated from the rest of the modular electronic device system 100. For example, the electronic device 104 can be a tablet computer having its own onboard processor (e.g., a central processing unit 114 (CPU)), memory device 116 (e.g., random access memory (RAM)), electronic storage device 118 (e.g., an HDD or SSD), power source 120 (e.g., a battery), a housing 122, a display screen 124 (e.g., an LCD), input device 126 (e.g., a touchscreen layer for the LCD), buttons 128, audio output devices 130 (e.g., speakers), cameras, at least one electronic port 132 for input and/or output of electronic communications and/or power (e.g., a universal serial bus (USB) port), an electronic bus 134 connecting the electronic components to each other, an input device adapter 136 connected to the electronic bus 134 and to the input devices, an output device adapter 138 connected to the electronic bus 134 and to the output devices, and similar computer components and elements known in the art. Some of these devices are shown schematically in FIG. 1.

The electronic device 104 can have a front surface 138 through which the display 124 and main user interface is viewed and a rear surface 140 positioned opposite the front surface 138 and configured to face away from a user that is directly facing the display 124. The rear surface 140 can therefore face away from the user in a rear-facing direction 142 that is perpendicular to the rear surface 140 of the electronic device 104.

The cover 102 can be referred to as a reversibly removable (i.e., non-destructively removable and without adhesive) case, skin, or protector for the electronic device 104 that is added to the housing 122. The cover 102 can have a rear portion 144 configured to overlap and at least partially cover or enclose the rear surface 140 of the electronic device 104. In some embodiments, the rear portion 144 can cover all of the rear surface 140 or substantially all of the rear surface 140 (e.g., all of the rear surface 140 except for a cutout for the camera 133 or another rear-facing sensor). The cover 102 can therefore act as a barrier preventing other objects from contacting and potentially damaging the rear surface 140.

In some embodiments, the cover 102 can include one or more sidewalls 146, 148, 150, 152 configured to at least partially wrap around lateral sides of the electronic device 104 (e.g., the sides through which the buttons 128 are positioned, through which the speaker 130 is exposed, or through which the electronic port 132 is positioned). In this manner, the cover 102 can enclose or house multiple sides of the electronic device 104 and can protect the electronic device 104 from impacts or contact with other potentially damaging exposure on its lateral sides. See also cover 502 of FIGS. 5A-5E. In some embodiments, the cover 102 can include a material that is water-resistant, caustic-chemical-resistant, or anti-bacterial to provide additional durability and protection for the electronic device 104 and its users. In some cases, the cover 102 can include a material that is easily cleanable. These features can be especially beneficial in hospitals and other health-related and dirty settings.

The cover 102 can include an expansion hub 154 positioned in and protruding from the center of the rear portion 144. In some embodiments, the expansion hub 154 can be positioned centered within a range of about 10 percent the overall width and/or length from the center point of the rear portion 144. The expansion hub 154 can have a rear electrical connector 156 and a latching or mounting connector 158 (e.g., a biased latch), as described in further detail below in connection with FIGS. 2 and 3. The expansion hub 154 can also have an electronic device connector 160 configured to make electronic contact with the electronic port 132 of the electronic device 104. For example, the device connector 160 can include a plug that is inserted into the port 132 to establish electrical communication between the connector 160 and the expansion hub 154. As used herein, two parts can be in "electrical communication" with each other when they are electrically connected to each other in a manner providing transfer of power or data signals between the parts. In some examples, the electrical communication can be through electrical contact between the parts, such as by conductive structures engaging with each other. In some examples, the electrical communication can be provided through wireless electrical pairing or exchange, such as by paired inductive coils providing power or by a wireless data communications antenna/transceiver. In some configurations, the device connector 160 can engage the electronic device in a direction perpendicular to the rear direction. For instance, the connector 160 can be configured to make a connection with (e.g., plug into) the electronic device 104 parallel to an axis perpendicular to direction 142.

The cover 102 can also include multiple outer perimeter edges (e.g., 162, 164). In some embodiments, these outer perimeter edges are simply part of the material used to enclose the electronic device 104, but in some embodiments, one or more outer perimeter edges can include an accessory connector (e.g., 166, 168, 170) configured to mount and attach an accessory device 110 and to provide electrical communication between the accessory device 110 and the expansion hub 154. Accordingly, the accessory connectors can be positioned at the peripheral parts of the cover 102 and can mechanically mount accessory devices while also providing electrical contacts for the accessory devices to be powered and to provide or receive signals from the electronic device 104 via the expansion hub 154 and connector 160. An example accessory connector system is described in further detail below in connection with FIG. 4.

The stand 106 can be configured to provide support to the electronic device 104 and cover 102 and to suspend them above a support surface (e.g., a tabletop, desk, or wall) to which the stand 106 is attached or on which the stand 106 is resting. For instance, the stand 106 and its arm portion can suspend the case or cover with the rear direction of the cover 102 being substantially horizontal (i.e., with the front- and rear-facing surfaces being vertical). The stand 106 can therefore be referred to as a support device that supports one or more modular components of the system 100, a base station configured to provide a "home" or base location for the attachment of modular components of the system 100 to a support surface.

The stand 106 can include an arm portion 172 extending from a vertical beam 174 and a base portion 176. A distal end 178 of the arm portion 172 can include an arm electrical connector to establish an electrical connection to the rear electrical connector 156 of the expansion hub 154 or to a rear electrical connector of the device adapter 108. See, e.g., the connection system of FIG. 3 and its related description below. The arm portion 172 can include a hinge 180 configured to pivot the distal end 178 relative to the vertical beam 174, such as by pivoting the distal end 178 about a horizontal pivot axis 182. In some embodiments, the arm portion 172 can pivot relative to the base portion 176 about a vertical pivot axis 183. Additionally, in some cases, the distal end 178 can rotate relative to the hinge 180, such as by allowing the distal end 178 to pivot between a first orientation (e.g., a landscape orientation) and a second orientation (e.g., a portrait orientation rotated 90 degrees relative to the landscape orientation), as indicated by arrow 181. The connected cover 102 and device adapter 108 can therefore also rotate between those rotated positions while being connected to the distal end 178.

The additional electronic component 114 can provide a connection to an external device or power source for the system 100. In some embodiments, the additional electronic component 114 can therefore be a plug or cord connecting the base portion 176 to a power grid or other power source. In some embodiments, the base portion 176 can include a power bank (e.g., a battery) or other electronic components (e.g., an electronic storage device or auxiliary device connector hub) configured to supplement or add to the capabilities of the electronic device 104 and that are therefore connected to the electronic device 104 via the distal end 178 of the arm portion 172.

The device adapter 108 can be referred to as a device hub. The device adapter 108 can be mountable to the cover 102 and can electrically connect to the rear electrical connector 156 using a front-facing electrical connector on the device adapter 108. See, e.g., FIG. 5B. The device adapter 108 can also include a rear electrical connector 184 and a device hub configured to extend the capabilities of the cover 102 when added to the cover 102. The device adapter 108 can therefore provide a pass-through connection from the rear electrical connector 156 to rear electrical connector 184 for the transfer of power and electronic communication (e.g., from the stand 106) to the electronic device 104 through the cover 102 and device adapter 108.

In some embodiments, a module hub (e.g., a USB device hub) can be positioned in the device adapter 108 to manage the provision of power and data from accessories (e.g., 112) and the stand 106 to the cover 102. The device hub of the device adapter 108 can be connected to the front- and rear-facing electrical connectors of the device adapter 108 and can control the transfer of power and data connections through the device adapter 108.

In some embodiments, the device adapter 108 includes one or more peripheral or accessory connection ports, plugs, pins, or mounting positions (e.g., latching portions 186) configured to couple with and electrically connect the accessories (e.g., 110, 112) to the device adapter 108. The latching portions 186 can therefore include electrical connections to the device hub and, via the device hub, to the front- and rear-facing electrical connectors. In this manner, the electronic device 104 can exchange, send, or receive signals from the accessories attached to the device adapter 108.

The addition of the device adapter 108 to the cover 102 can increase the overall number or connection types of the mounting points for accessories as compared to the cover 102 alone. For example, plugs or sockets for connection to accessories on the device adapter 108 can be different types (e.g., one-way versus two-way data transfer, audio versus video, VGA versus HDMI display ports, etc.) or can provide different power levels than the cover 102 or relative to each other. In some embodiments, the cover 102 lacks any accessory connectors, and the addition of the device adapter 108 therefore introduces the possibility for accessory expansion of the capabilities of the electronic device 104. Furthermore, in some embodiments, the device adapter 108 can include integrated components (e.g., a battery, camera, etc.) that, rather than using a latching portion 186 to attach to the system 100, are an integrated part of the device adapter 108 itself and are usable by the electronic device via the device adapter 108 and cover 102 when the device 104 is mounted in the cover 102 and the device adapter 108 is mounted to the cover 102.

The accessory devices 110, 112 can include input devices (e.g., sensors, thermometers, keypads, barcode scanners, magnetic strip or chip readers, etc.), output devices (e.g., lights, rangefinding emitters, printers, external device controls, displays or display connections, etc.), electronic storage components (e.g., flash memory), energy storage devices (e.g., batteries), similar devices, and combinations thereof. The accessory devices 110, 112 can be attachable to the cover 102, to the device adapter 108, or to either one interchangeably. In some embodiments, the mounting or latching positions on the cover 102 and device adapter 108 can therefore be consistent in their attachment mechanisms and electrical connections so that a device (e.g., a card reader accessory 110) can be mounted to the cover 102 or device adapter 108 interchangeably. In some embodiments, the cover 102 and device adapter 108 can provide different kinds of connection points so that different kinds of accessories can be connected to the system 100 based on the needs of the user.

The accessory devices 110, 112 can generally be configured to be portable with the electronic device 104, cover 102, and device adapter 108 so that their addition to the system 100 does not force the user to remain stationary or in a limited range of nearby locations (e.g., as would be the case if an accessory 110 included a chain or cord to another external device). Additionally, accessories 110, 112 can be configured to draw power from the electronic device 104 or from other power-supplying accessories connected to the system 100. Thus, in some embodiments, the accessories 110, 112 may not need their own internal power source (e.g., their own battery) to operate. Furthermore, accessories 110, 112 can be configured to establish electronic communication with the electronic device 104 via a wired connection (e.g., through the cover 102) or by a wireless connection (e.g., via a wireless communications system and protocol known in the art (e.g., BLUETOOTH®, RFID, WI-FI®, infrared transceiver, radio frequency transceiver, etc.)).

Accessory devices 110, 112 provide modular customizability and adjustability to the system 100 by allowing the electronic device 104 to take on new functions and capabilities depending on the needs of an individual user or enterprise user. Furthermore, accessories can be changed or exchanged to permit the users to adapt the system 100 for new purposes and settings over time. For example, a first set of accessory devices can be used by the electronic device 104 at a first time, a change of conditions can be detected, and then the user can exchange, add, or remove an accessory device from the first set to define and use a second set of accessory devices for the electronic device 104.

Figure 2:
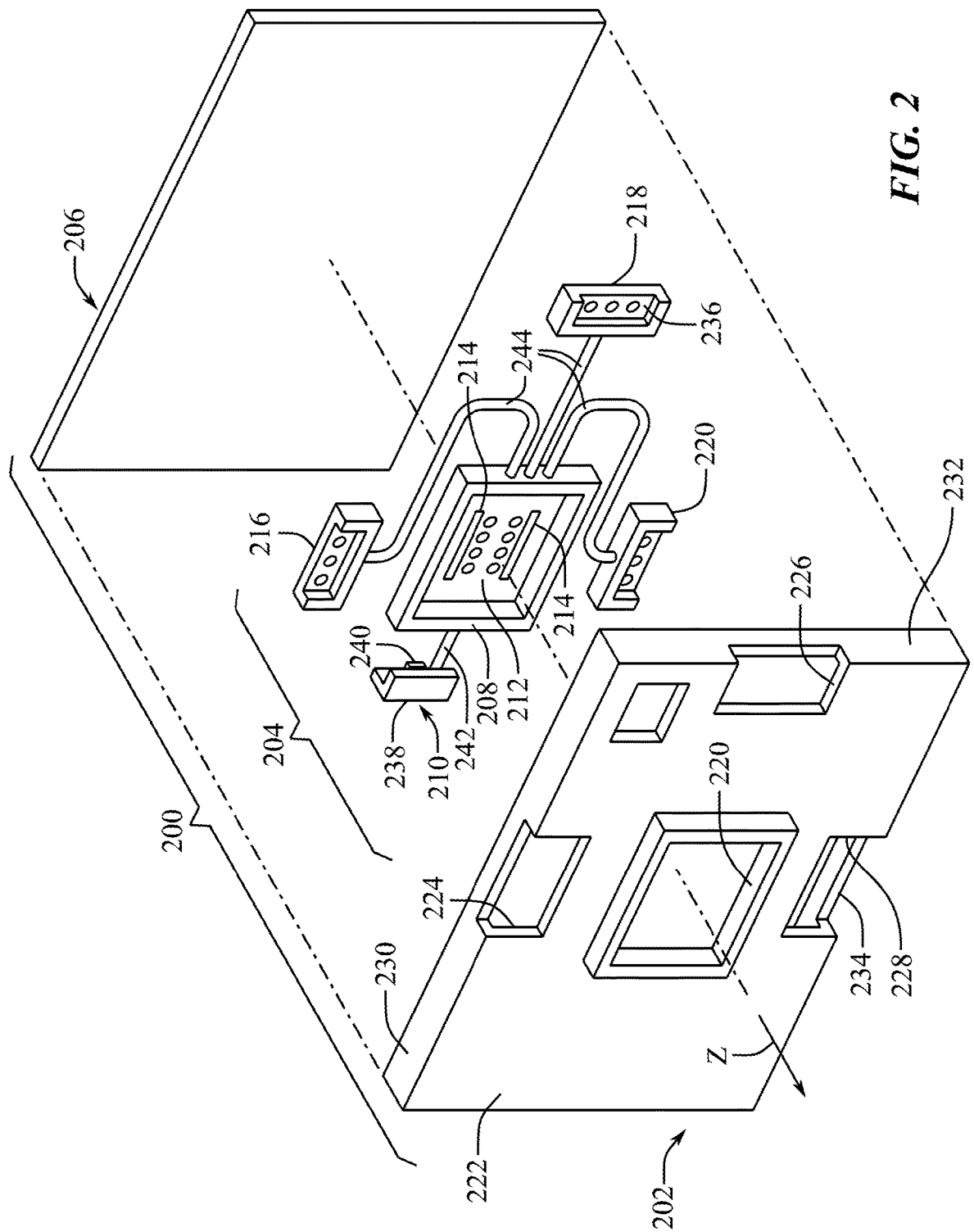
FIG. 2 shows an exploded perspective view of a cover for an electronic device.

FIG. 2 shows an example embodiment of a cover 200. The cover 200 has the properties and features of cover 102 described above, and the properties and features of cover 200 are used in cover 102. The cover 200 is shown in an exploded view, wherein the cover 200 includes a rear housing 202 (i.e., a rear casing), an expansion hub 204, and a front housing 206 (i.e., a front casing). In some embodiments, the rear housing 202 (i.e., a rear casing) and front housing 206 (i.e., front casing) can be integrally formed as a single part, and the expansion hub 204 can be attached to that single part. In some embodiments, the expansion hub 204 can be formed within (e.g., co-molded within) the rear housing 202 and front housing 206, thereby integrating the expansion hub 204 amongst the other parts of the housing and embedding the parts of the expansion hub 204 within the surfaces and protection of the housing portions.

The expansion hub 204 can include a central housing 208 that is electrically joined to a first electrical connector 210. A rear side of the central housing 208 can include the second electrical connector 212 including a plurality of electrical contacts or pins positioned on the housing 208. The central housing 208 can also include a mounting connector 214 to mate the central housing 208 to a second mounting connector positioned external to the rear side of the central housing in response to movement of the central housing in a rearward direction (i.e., along axis Z). For example, the second mounting connector can be positioned on the distal end 178 of the stand 106 or on the front-facing surface of the device adapter 108. In the embodiment shown in FIG. 2, the mounting connector 214 includes two diagrammatically shown elongated rectangles which represent openings or latches configured to connect to respective latches or openings of the second mounting connector external to the central housing 208. The central housing 208 can also be configured to contain a device controller or hub module configured to manage connections to optional peripheral accessories at accessory mounts 216, 218, 220 that are spaced away from the central housing 208 but are electrically connected back to the central housing 208. See also FIG. 6 and its related descriptions herein. The accessory mounts 216, 218, 220 can be positioned peripherally external to the housing 208.

The central housing 208 can be positioned in an opening 220 in the center of the rear side 222 of the rear housing 202 so that the second electrical connector 212 and mounting connector 214 are exposed and accessible through the rear housing 202. The accessory mounts 216, 218, 220 are structures positioned in portions of the cover 200 where accessories (e.g., 110, 112) can be conveniently retained and used. In some embodiments, the accessory mounts 216, 218, 220 are positioned centered in the edges of the rear side 222 of the rear housing 202, such as by being positioned in openings 224, 226, 228 along the peripheral edges of the rear surface 222. The openings 224, 226, 228 can at least partially extend around the peripheral edges, wherein a portion of the opening is on the rear side of the rear housing 202 and a second portion of the opening is formed through the lateral sides 230, 232, 234 of the rear housing 202. In this way, at least one accessory mount (e.g., 218) can define a recess (e.g., 236) that opens laterally (e.g., through the lateral side 232) and rearwardly (e.g., through rear side 222). In other words, a recess 236 can be accessible through the lateral side 232 and through the rear side 222 due to the shape of opening 225 cutting into each of the sides 222, 232 and due to the recess 236 having a similar shape. An accessory device therefore can be inserted into the accessory mount (e.g., 218) and into the opening (e.g., 226) parallel to a direction extending perpendicular to the lateral side (e.g., 232). This can allow the accessory device to be installed using tracks or grooves in the recess (e.g., 236) that guide or automatically align the device into place on the accessory mount (e.g., 218) and that prevent it from falling out of the accessory mount while attached. See, e.g., FIG. 4 and its related connection system 400.

An accessory device in the recess 236 can also be exposed to the rear direction due to the opening (e.g., 226) having an open rear portion. This rear exposure can be advantageous to allow the accessory device to be thicker than the cover 202 or recess 236 in the rear direction, such as by at least partially protruding from the rear side 222 when mounted to the recess 236. The increased thickness can be used with large accessory devices such as batteries, barcode scanners, devices with moving parts, etc. Additionally, sensors or output devices (e.g., a secondary camera lens or flash) can be exposed on the rear side of the accessory device and can be accessible or visible through the rear part of the opening (e.g., 226) so that they can receive their input or provide their output without necessarily having to protrude from the lateral side (e.g., 232) or rear side 222.

The first electrical connector 210 can be positioned in a portion of the rear housing 202 and can be configured to be aligned with and connected to a connector on the electronic device 104 when the device 104 is mounted to the cover 200. For instance, the first electrical connector 210 can include a support portion 238 and a connector plug 240 supported and protected by the support portion 238. The support portion 238 can keep the connector plug 240 from being damaged due to twisting or bending by partially surrounding and bracing the connector plug 240 against the electronic device 104 while the plug is inserted into the electronic device 104. This can be beneficial when the rear housing 202 is made of an at least partially flexible material and would not otherwise provide a rigid housing to protect the connector plug 240 while it is in the electronic device 104.

The first electrical connector 210 and accessory mounts 216, 218, 220 can each be connected to the central housing 208 of the expansion hub 204 by flexible cables 242, 244. The flexible cables 242 can be positioned on opposite sides of the central housing 208 (enabling them to have a minimized length to the edges of the cover 200) and can be routed through wire-guiding channels or recesses in the rear housing 202 or can be co-molded, adhered, or otherwise attached to the rear housing 202. The flexibility of the cables 242, 244 can allow a manufacturer of the cover 200 to position the first electrical connector 210 and accessory mounts 216, 218, 220 wherever they are needed in the cover 200. For instance, if the size and layout of the electronic device 104 changes over time due to changes in features over product cycles (e.g., change in position or size of camera 133, buttons 128, speaker 130, size of housing 122, etc.), cover manufacturers are enabled to adapt to those changes by using existing expansion hubs 204 and merely changing the positions of the first electrical connector 210 and openings 220, 224, 226, 228 as needed to accommodate a new electronic device 104 (e.g., to position the accessory mounts 216, 218, 220 in a new cover without covering a speaker 130 that is repositioned when a new electronic device 104 is released).

Additionally, the number of accessory mounts 216, 218, 220 can be customized by the manufacturer, wherein any number of accessory mounts can be used (including zero) in a cover 200. In some embodiments, three accessory mounts are used to provide a user with access to accessory mounts on each side of the electronic device 104 that is not occupied by the first electrical connector 210. In some embodiments, one or more accessory mounts can be used on the same side as the first electrical connector 210. In some embodiments, multiple accessory mounts can be used on a single side or edge of the rear housing 202. This customization of the cover 200 is enabled at least in part by the flexible cables 242, 244 and their connectability to (or disconnectability from) the central housing 208 for each accessory mount.

Figure 5A:
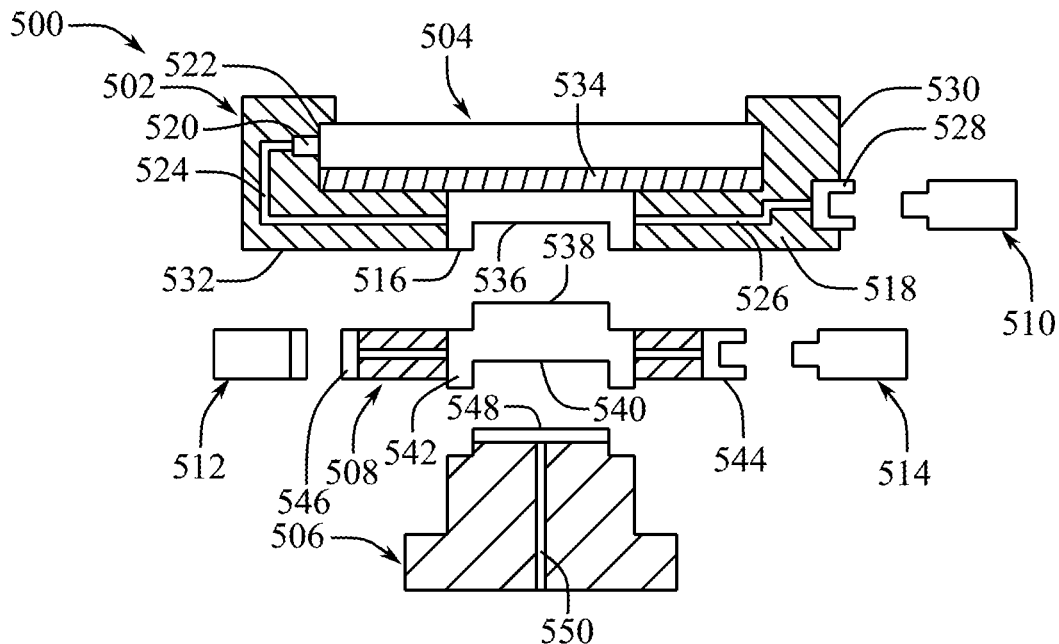
FIGS. 5A-5E schematically show various configurations and combinations of modular electronic device system components.

The front housing 206 can be positioned on a front side of the rear housing 202 and expansion hub 204 to cover the front-facing surfaces of the rear housing 202 and expansion hub 204. The end user of the cover 200 and electronic device can therefore use the entire cover 200 as a single unit, and the wiring and electronic components of the expansion hub 204 can be aesthetically hidden and also protected from damage due to exposure. Thus, the front housing 206 can hide the central housing 208 and cables 242, 244 when the cover 200 is viewed from the front. The front housing 206 can include a soft, compliant, non-marring material configured to contact the rear surface of the electronic device 104 without scratching or blemishing the device, such as felt, fabric, foam, velvet, flexible plastic, leather, similar materials, and combinations thereof. An example positioning of a front housing 206 is shown in front housing 534 of FIG. 5A. The front housing 206 can have its width, length, and depth dimensions arranged to fit within the rear housing 202 with the rear housing 202 covering the sides of the front housing 202 (as shown in FIG. 5A). In some embodiments, the front housing 206 can have its dimensions arranged to cover all or substantially all of the width and length dimensions of the rear housing 202. In that case, the rear housing 202 can be prevented from contacting the electronic device 104 due to the interposed front housing 206.

Furthermore, although FIG. 2 shows an expansion hub 204 configured to be positioned in a cover 200, aspects of the expansion hub 204 can be used in other modular devices of the system 100. For example, the device adapter 108 can include a central housing (e.g., 208) with its related components, flexible cables (e.g., 244), and accessory mounts (e.g., 216, 218, 220) in their own front and rear housings. As shown in FIG. 1, for example, the device adapter 108 can have three device connections 186 that can correspond to the accessory mounts of FIG. 2 or that can be used with accessories of a different type (e.g., the male connectors shown extending to the left and bottom directions from the device adapter 108 in FIG. 1 and the female connector opening to the right direction from the device adapter 108 in FIG. 1).

A central housing 208 used in a device adapter 108 or similar modular component may include a rear electrical connector 184 and a front electrical connector. See, e.g., connectors 538 and 540 in FIGS. 5A, 5B, and 5D. The front electrical connector can enable the device adapter 108 to connect to a rear electrical connector 212 of a cover 102/200 and to thereby provide paths for electrical communication between the device adapter 108, the cover 102/200, and the electronic device 104, as further described below.

Figure 3:
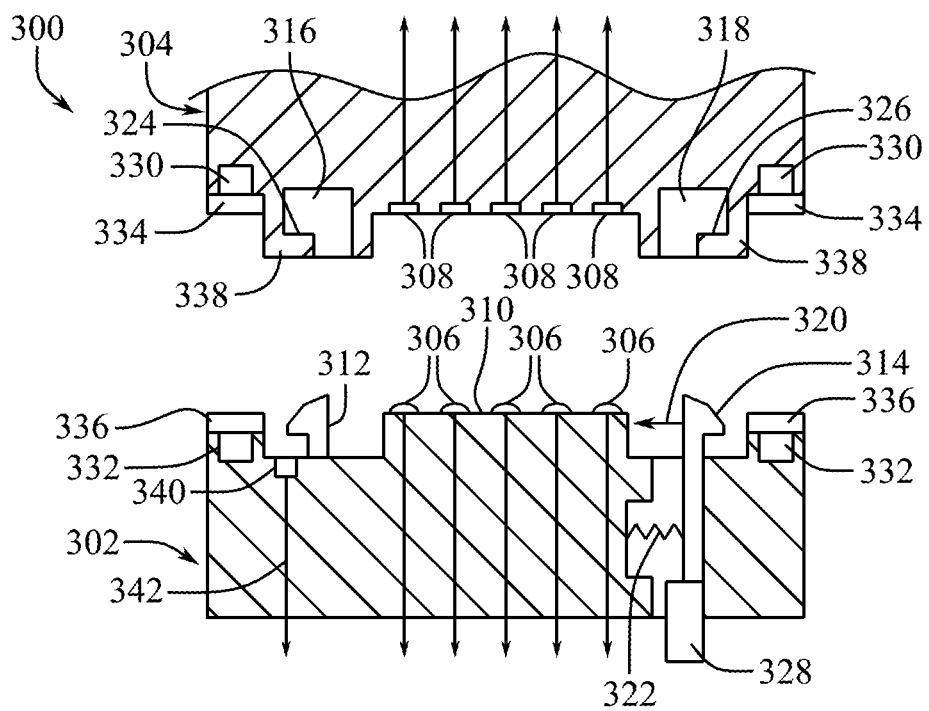
FIG. 3 shows a schematic side section view of a set of connector devices for use in a modular electronic device system.

FIG. 3 shows a schematic side section view illustrating features of a connection system 300 with electrical connectors and mechanical latches usable with the covers 102/200, device adapter 108, and stand 106. The system 300 can have a male connector 302 configured to attach and connect to a female connector 304. In an example embodiment, the male connector 302 can be positioned on the stand 106, and the female connector 304 can be positioned on the rear side of a central housing 208 of an expansion hub 204. In some embodiments, their positioning can be reversed. Furthermore, a device (e.g., device adapter 108) can include a male connector 302 on one side (e.g., the front side) and a female connector 304 on the opposite side (e.g., the rear side) thereof, such as the device adapter 508 of FIG. 5A. FIG. 3 schematically shows features that are implemented in system 100 and cover 200.

Each connector 302, 304 can include a set of electrical contacts 306, 308 configured to engage each other upon attachment of one connector to the other. These electrical contacts 306, 308 can thereby establish electrical communication across the connectors 302, 304. A first set of the electrical contacts (e.g., 306 in this embodiment, but can be 308 in another embodiment) can include a set of biased members configured to extend at least partially away from an outer surface 310 of the connector 302. For instance, the biased members can be a set of pogo pins that are depressible into the outer surface 310 to ensure a consistent connection with the other electrical contacts (e.g., 308). Corresponding pairs of contacts can electrically couple electrical traces, wires, or other conductors in the connectors 302, 304. In some embodiments, the contacts 306, 308 can include other electrical connector designs, such as, for example, a plug having prongs and an electrical socket configured to receive and make an electrical connection with the prongs.

In some embodiments, the number of pins or contacts corresponds to the expansion capability of the system. For instance, a pair of contacts can be used for ground, a pair can be used for power (e.g., 5-watt or 7.5-watt power per accessory device), a pair can be used for a first data stream (e.g., between the electronic device and the stand), another pair can be used for a second data stream (e.g., between the electronic device and an accessory device), and another pair can be used for a third data stream (e.g., between the electronic device and a device adapter accessory device). In various embodiments, the number of contacts can therefore be designed and optimized based on the expandability of the modular system. In an example embodiment, the number of pairs can match the number of pairs in a standardized connector system such as, for example, USB-C or similar standards. Thus, although five pairs of contacts are shown in FIG. 3 and a set of eight contacts is shown in FIGS. 1 and 2, any number of contacts that would fit on the central housing 208 or stand 106 and within the connectors 302, 304 can be used. In some embodiments, a set of separate data stream connections can be used for each accessory mount (e.g., 216, 218, 220), and a ground connection and power connection can also be provided to each mount. The central housing 208 can include an electronic expansion hub to manage the distribution of power and the transmission of data streams to the accessory devices on the cover, to the stand (and any devices attached to or positioned in it), and to the device adapter (and any devices attached to or positioned in it). See, e.g., expansion hub 602 in FIG. 6.

A portion of each connector 302, 304 can be used for mechanically latching the connectors 302, 304 to each other. In this embodiment, the male connector 302 includes a set of latching hooks 312, 314 on each side of the contacts 306, and the female connector 304 includes a set of receiving slots 316, 318 configured to align with and receive the latching hooks 312, 314. The hooks 312, 314 can be referred to as first and second latching portions (e.g., arm latching portions when they are located on a support arm), and the slots 316, 318 can also be referred to as first and second latching portions (e.g., case latching portions when they are located on a case or cover). In some embodiments, one of the latching hooks 312 is stationary on the connector 302, and one of the hooks 314 is movable relative to the connector 302. Thus, when the male connector 302 approaches the female connector 304, the hooks 312, 314 can be inserted to the slots 316, 318 as the stationary hook 312 moves into slot 316 and the movable hook 314 moves into slot 318. The movable hook 314 can deflect radially inward (along direction 320) as the hooks 312, 314 move into the outermost portions of the respective slots 316, 318, and then, once the hook 314 is inserted into the inner cavity of the slot 318, a biasing device 322 can bias the hook 314 radially outward (opposite direction 320) to latch the hook 314 in slot 318. Simultaneously, the hook 312 can be fully inserted into the inner cavity of slot 316. In this position, the male connector 302 can have its contacts 306 in electrical communication with the corresponding contacts 308 of the female connector 304. The hooks 312, 314 can prevent unintentional withdrawal or disconnection of the connectors 302, 304 from each other due to the hooks engaging against latching surfaces 324, 326 within the slots 316, 318.

When the connectors 302, 304 need to be separated from each other, a detachment slide 328 can be moved in a direction parallel to the direction 320 to overcome the biasing force of the biasing device 322 and to move the hook 314 into position where it can be pulled or slide out of the slots 318 without engaging the latching surface 326. Accordingly, one side of the connection system 300 can be disengaged while the opposite side with hook 312 remains engaged with latching surface 324. This one-sided unlatching system can help prevent the connectors 302, 304 from disconnecting from each other prematurely, especially when the weight of the electronic device, cover, or similar structures are being borne by the mechanically interlocking hooks 312, 314. Thus, an additional step can be needed to fully disconnect the connectors 302, 304 from each other, wherein, after moving the hook 314 to a disconnecting position that is not engaging the latching surface 326, the connector 302 having hook 312 can laterally slide hook 312 away and out of engagement with surface 324 or can be rotated to pivot the released hook 314 out of slot 318, then to slide the other hook 312 out of its slot 316. In some embodiments, both hooks 312 can have respective biasing devices and slides 328 to deflect them in each of the slots 316, 318. Thus, two latches may need to be simultaneously deflected by the user to separate the connectors 302, 304 from each other.

The connectors 302, 304 can also include a set of magnetic structures 330, 332 that are configured to be positioned around a perimeter or outer portion of the connectors 302, 304. The magnetic structures 330, 332 can be configured to be magnetically attracted to each other and to therefore apply attractive magnetic forces between the connectors 302, 304 to help guide and secure the connectors 302, 304 to each other when they are brought into close proximity with each other. In some embodiments, the magnetic structures 330, 332 can include permanent magnets, electromagnets, ferromagnetic materials, similar structures, and combinations thereof. A set of durable, non-marring material layers 334, 336 can overlay the magnetic structures 330, 332 to help cushion the engagement of connectors 302, 304, to prevent engagement of harsh scratching or marring structures in the connectors 302, 304, and to keep the magnetic structures 330, 332 protected. For instance, the material layers 334, 336 can include a rubber, rubberized, or plastic material, such as a self-healing plastic that minimizes scratches and/or absorbs them non-permanently, whereas other portions of the connectors 302, 304 can include metal (e.g., aluminum) or other materials that would scratch more easily or would scrape against each other, thereby providing a less comfortable user experience than connectors using plastic material layers as guards or bumpers.

The inclusion of the magnetic structures 330, 332 can also help make the connectors 302, 304 capable of blindly mating with each other. In other words, the magnetic structures 330, 332 can use their magnetic attraction to each other to align the connectors 302, 304 within a certain range of distances without the user having to look at the connectors 302, 304 to ensure their proper alignment. The magnetic structures 330, 332 can guide the user's hands even if the connectors are out of view (i.e., the user is "blind"). This magnetic guiding force, in conjunction with the mechanical latches using hooks 312, 314 and slots 316, 318, can allow a user to completely couple and attach the connectors 302, 304 to each other by using his or her sense of touch and feeling the combined force feedback provided by the magnetic attraction and the hooks engaging the slots.

Furthermore, the connectors 302, 304 can have the magnetic structures 330, 332 and their covering material layers 334, 336 positioned around a perimeter or outer circumference of the connectors 302, 304 in a manner that prevents the contacts 306, 308 from being seen or accessed while the connectors 302, 304 are coupled to each other. In other words, the presence of the magnetic structures 332 can visually block a user from seeing between the connectors 302, 304 once the material layer 336 is laterally adjacent to a protrusion 338 containing a slot 316, 318, and the protrusions 338 can visually block the contacts 306, 308 from view at the side of the connectors 302, 304. The visual barriers provided by the protrusions 338 and protruding magnetic structures 332 also help show that these connectors 302, 304 are blind mating connectors because they prevent a user from seeing the connections when they are about to be made.

At least one of the connectors 302, 304 can include a connector sensor 340 is configured to detect the presence of a coupling of the connectors 302, 304 relative to each other. In an example embodiment, the connector sensor 340 can include a Hall-effect sensor used to measure and detect magnetic field output by magnetic structures 330 or the change in the magnetic field of the magnetic structures 332 has caused by introduction of the protrusion 338 near to the connector sensor 340. A sensor data line 342 can connect to a controller (e.g., of the expansion hub or stand) for providing power to the contacts 306, 308 to ensure that power provided to the contacts is disabled when the connectors 302, 304 begin to separate from each other. This connector sensor 340 can help ensure physical mating before the contacts 306, 308 are powered and can help thereby to avoid dendrite growth. In some embodiments, the connector sensor can be a biased pin that is depressed when the connectors 302, 304 are attached to each other or another mechanical switch configured to make an electrical connection when the connectors 302, 304 are joined. In some embodiments, the connector sensor 340 can be used to detect the connection of the connectors 302, 304, and its signal can be used to initiate or authenticate on-attachment pairing of electronic devices (e.g., on-attach wireless BLUETOOTH® pairing of the electronic device to accessory devices or the stand).

Figure 4:
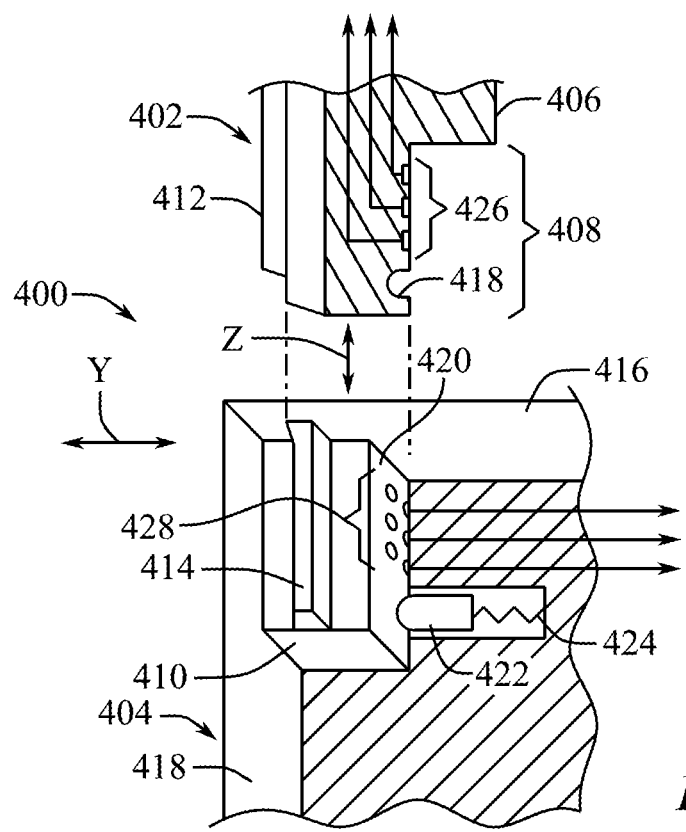
FIG. 4 shows a schematic perspective section view of an accessory device and a cover for use in a modular electronic device system.

FIG. 4 is a perspective view of an accessory connection system 400 according to embodiments of the present disclosure. The connection system 400 can include an accessory device 402 configured to slide into an accessory mount 404. The accessory device 402 can be one of the various accessory devices disclosed elsewhere herein, and the accessory mount 404 can be one of the other accessory mounts disclosed elsewhere herein. The accessory device 402 accessory mount 44 are not shown to scale in order to improve clarity in disclosure of the features of the connection system 400. FIG. 4 schematically shows features that are implemented in system 100 and cover 200.

The accessory device 402 can include an enlarged width portion 406 and a narrowed width portion 408. The narrowed width portion 408 be configured to be inserted into a recess 410 of the accessory mount 404. In some embodiments, the enlarged width portion 406 is omitted or has the same width as the narrowed width portion 408. The accessory device 402 can also include one or more ridges 412 or tongues configured to make sliding engagement with corresponding grooves such as groove 414 adjacent to the recess 410 in the accessory mount 404. In FIG. 4, the ridge 412 extends laterally (i.e., perpendicular to the Y and Z axes), and a second ridge 412 can be used on the opposite side of the accessory device 402 (i.e., also perpendicular to the Y and Z axes). In this manner, the ridges 412 and grooves 414 can permit bidirectional sliding motion of the accessory device 402 relative to the accessory mount 404 (i.e., along axis Z). Once ridge 412 is positioned in groove 414, the accessory device 402 can thereby be prevented from moving relative to the accessory mount 404 along a front-rear axis Y shown in FIG. 4. Thus, when accessory mount 404 is used as an accessory mount in one of the embodiments shown above (e.g., as mount 216), for example, the accessory device 402 is insertable through lateral side 416 of the mount 404 and is not insertable into the recess 410 through the rear side 418 (which corresponds to a rear-facing surface of rear portion 144 or a surface such as rear surface 222).

The connection system 400 can also include at least first and second retaining elements configured to prevent the accessory device 402 and accessory mount 404 from disconnecting unintentionally. For example, the narrowed width portion 408 can include a detent 418 configured to be facing inward toward a wall 420 of the recess 410 upon insertion of the accessory device 402. When the accessory device 402 has been sufficiently inserted into the recess 400 along axis Z, the detent 418 can align with and receive a pin, ball, or other biased protrusion 422. In other words, the biased protrusion 422 can partially retract into surface 420 as the narrowed width portion 408 approaches and contacts biased protrusion 422, thereby applying a force to the biased protrusion 422 that overcomes a biasing force applied by a biasing spring member 424. Accordingly, with the accessory device 402 fully engaged with the detent 418 receiving the tip of the biased protrusion 422, a minimum pull force along direction Z is required to remove the accessory device 402 from the accessory mount 404 that will overcome the force applied by biasing member 424 and will retract the biased protrusion 422 into surface 420 again to release the accessory device 402.

A set of electrical contacts 426 can be positioned on an inward facing surface of the accessory device 402, and a corresponding set of electrical contacts 428 can be configured to engage with the electrical contacts 426 of the accessory device 402. The sets of electrical contacts 426, 428 can be electrically connected to each other when the accessory device 402 is inserted into the position wherein the protrusion 422 soft-locks the accessory device 402 in place in the recess 410. The electrical contacts 426 of the accessory device can provide power and data connections for the sensors, input devices, output devices, etc. of the accessory device 402, and the electrical contacts for 28 can provide corresponding connections to an expansion hub module is part of the cover to which the accessory mount 404 is attached or to a device adapter (e.g., 108). In some embodiments, three total electrical connections between contacts 426, 428 are established, with one for ground, one for power, and one for data communication between the accessory device 402 and the mount 404. In some embodiments, a single electrical connector can be used for both power and data communication (e.g., using power over Ethernet (PoE) or similar technologies) to simplify connectors, enable smaller connectors, and reduce manufacturing costs.

FIGS. 5A-5E illustrate schematic side section views of various configurations of the components of embodiments of the modular computing systems disclosed herein. The system 500 can include a cover 502, electronic device 504, stand 506, device adapter 508, a first accessory device 510, a second accessory device 512, and a third accessory device 514. In FIG. 5A, all of the components, aside from the cover 502 and electronic device 504, are shown in exploded view and separated from each other. As shown in FIGS. 5B through 5E, the components of the system 500 can be arranged in various combinations to provide different degrees and types of functionality for a user of the system 500.

The cover 502 can include an expansion hub 516 embedded in the rear housing 518 and joined to an electrical connection 520 at a lateral side 522 of the electronic device 504. An electrical path 524 can extend through the cover 502 to provide electrical communication between these parts. A second electrical path 526 can connect the expansion hub 516 to an accessory mount 528. Accessory device 510 or accessory device 514 can be mounted to accessory mount 528, as shown in FIGS. 5B through 5E. In these figures, the accessory mount 528 is only exposed and accessible through a lateral side 530 of the cover 502 rather than also being open at the rear surface 532. The cover 502 can also include a front housing 534 shown positioned between the electronic device 504 and the expansion hub 516. The cover 502 is shown with a female connector portion 536 the faces rearward, i.e., downward in FIG. 5A. FIG. 5A also shows that the cover 502 can have its structure (e.g., the rear housing 518) at least partially wrap around and partially enclose or cover a portion of the front-facing surface of the electronic device 504. This configuration can further enhance device protection, can improve the user's grip on the cover 502 and electronic device 504, and can protect the electrical connector 520.

Figure 5B:
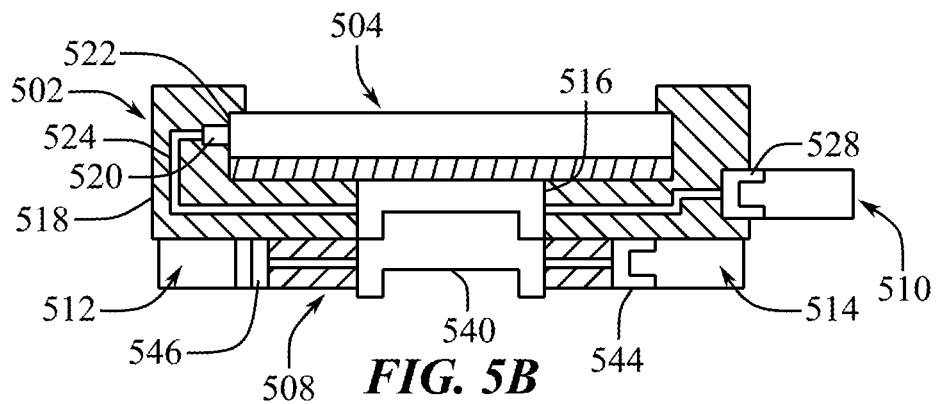
Figure 5C:
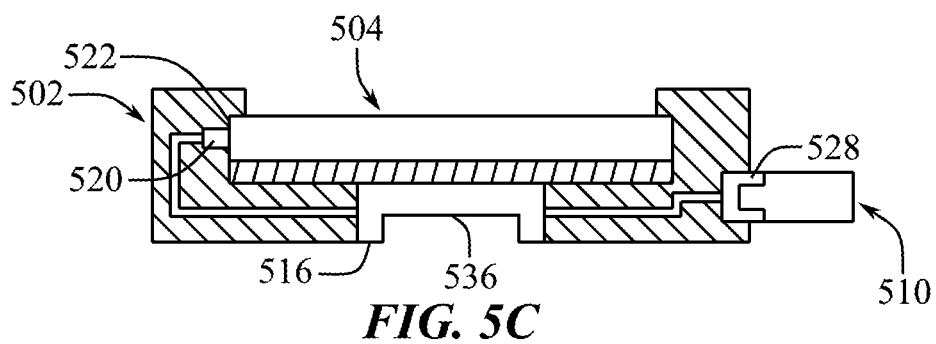
Figure 5D:
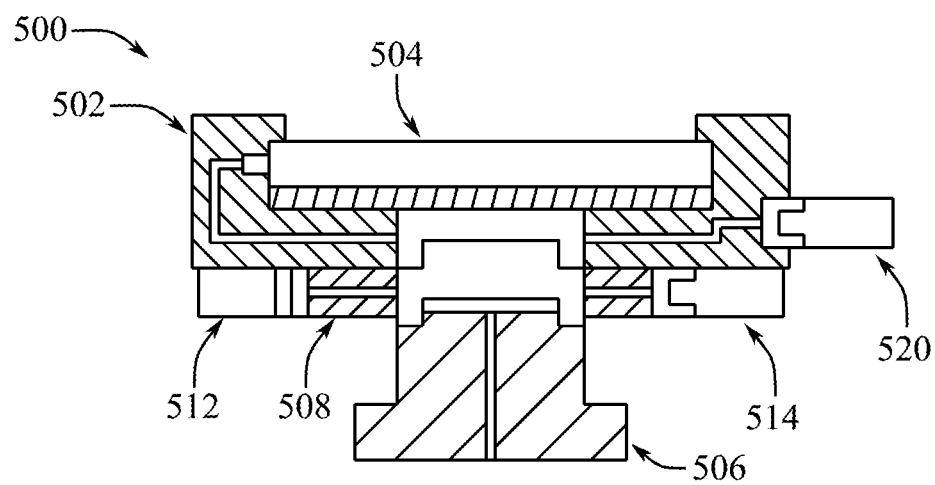

The device adapter 508 includes a male connector portion 538 on its front side that is attachable to the female connector portion 536 of the expansion hub 516, as shown in FIGS. 5A, 5B, and 5D. The rear side of the device adapter 508 can include a female connector portion 540 connectable to another male connector portion (e.g., 542). The male and female connector portions 538, 540 can be positioned on a hub 542 of the device adapter 508. The hub 542 to be connected to a first accessory mount 544 similar to accessory mount 528 and a second accessory mount 546 configured to connect to a different type of accessory device, such as, for example, device 512. The first accessory mount 544 can be attachable to accessory devices 510, 514. Thus, as shown in FIGS. 5A through 5E, accessory mounts 528 and 544 can be configured as female accessory mounts configured to at least partially receive a portion of the accessory devices 510, 514. The accessory mounts 528, 544 can have connection systems such as systems 300 or 400.

The stand 506 can include a male connector portion 548 to engage and connect to the device adapter 508 or the cover 502. A connection line 550 can extend through the stand 506 to internal electronic components of the stand 506 or to provide a connection to external devices or power sources.

FIG. 5B shows a configuration of the system 500 with the cover 502 attached to the electronic device 504, attached to the accessory device 510, and attached to the device adapter 508. The device adapter 508 is itself connected to two accessory devices 512, 514 which are separate from the accessory device 510 directly attached to the cover 502. The configuration shown in FIG. 5B is portable and movable since it is not mounted to a stand 506 and provides a large amount of accessory device compatibility via multiple accessory mounts and accessory mounts of different kinds (e.g., two female mounts and one additional face-to-face engaging mount for device 512).

FIG. 5C shows another configuration that is similar to FIG. 5B accept that the device adapter 508 and its related accessory devices 512, 514 are disconnected from the cover 502. This configuration minimizes weight of the modular system, which can be beneficial in certain applications.

FIG. 5D shows the entire set of modular components in the system 500 all assembled together to work as a unified computing system. In this embodiment, power routed from the stand 506 to the other components can electrically supply operation of the electronic device and the accessory devices. Furthermore, because the stand 506 is supporting the weight of the rest of the system 500, the overall weight of the system 500 would not fatigue a user who would otherwise need to hold the system 500 in his or her arms.

Figure 5E:
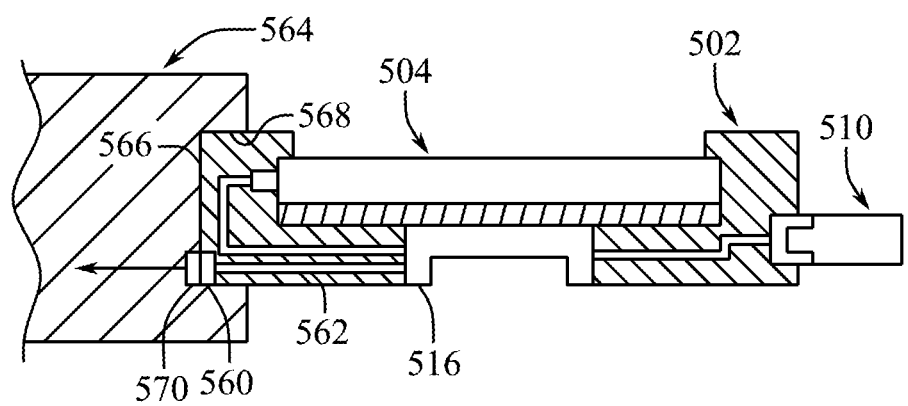

FIG. 5E shows a related embodiment wherein the cover 502 includes a side-located charging connector 560. The charging connector 560 can be in electrical communication with the expansion hub 516 via a connection path 562 through the cover 502. The cover 502 and electronic device 504 can be mounted to a stand 564 with a lateral side 566 of the cover 502 inserted into a recess 568 in the stand 564. A cover 502 with a side-located charging connector 560 can be easily connected to a charging connector 570 within the recess 568 to provide a power connection to the cover 502 while multiple covers 502 and or electronic devices 504 are stacked or otherwise approximated in a front-to-back in a gang-charging stand apparatus (e.g., stand 564) or vertical stand.

Figure 6:
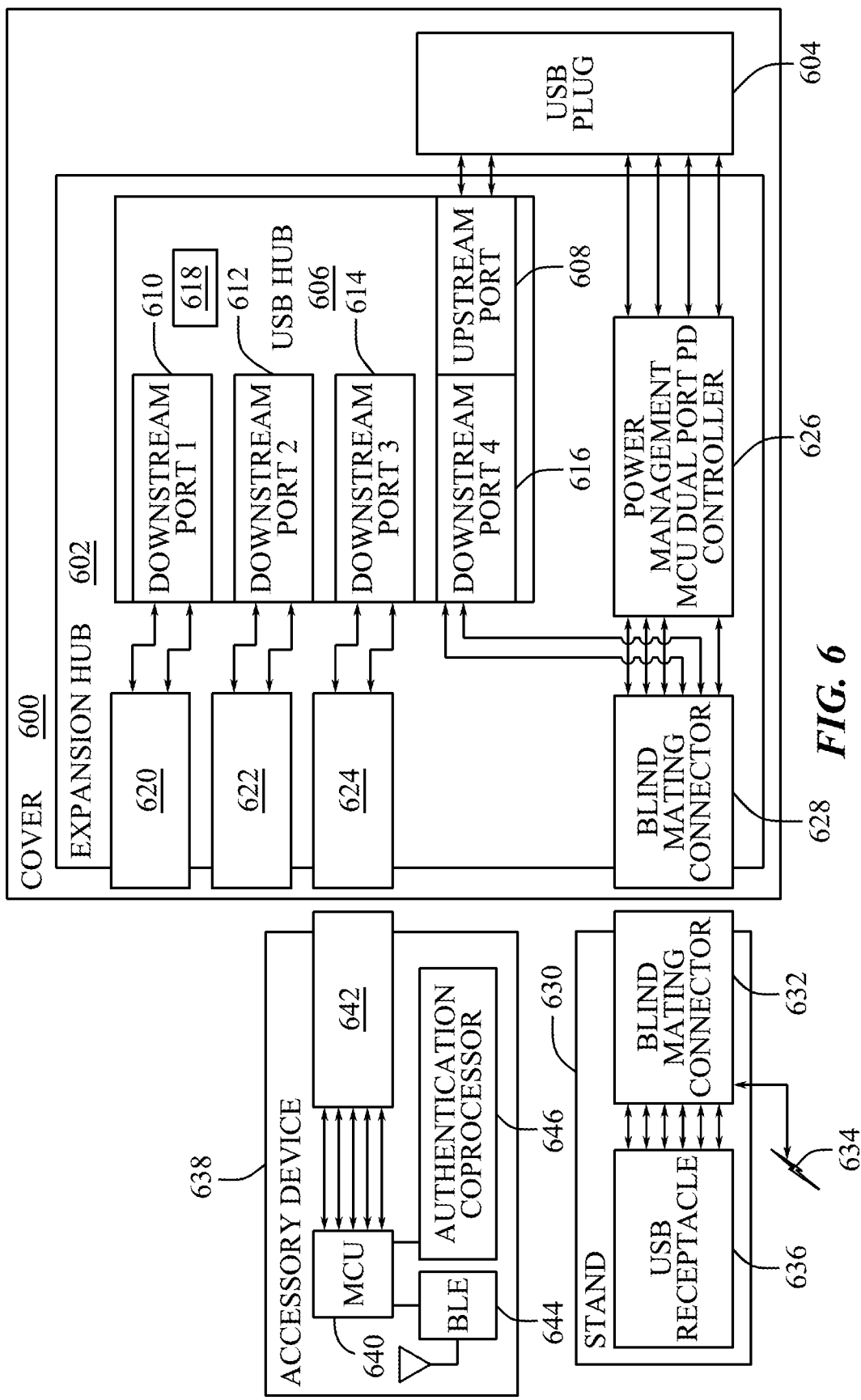
FIG. 6 shows a block diagram of electronic components of the modular electronic device system of FIG. 1.

FIG. 6 shows a block electrical diagram for electronic device systems disclosed herein. The diagram diagrammatically shows the cover 600 (with its expansion hub 602), an accessory device 638, and a stand 630. An additional hub (e.g., device adapter 108 having its own expansion hub similar to hub 602 and/or controller 626) can be added between the blind mating connectors 628, 632. The circuit layout can extend through the cover 600 and its expansion hub 602, with the first electrical connector 604 being a USB connector or similar structure configured to connect to the electronic device. The expansion hub 602 can also incorporate a USB hub 606 (i.e., a device hub or port routing hub) with an upstream port 608 connected to the first electrical connector 604 and a group of downstream ports 610, 612, 614, 616 controllable by a controller 618 (e.g., a microcontroller, processor, or control logic) that is part of the USB hub 606. The controller 618 can manage the transfer of data and power between the first electrical connector 604 and accessory mount connectors 620, 622, and 624. The expansion hub 602 can further include a power management microcontroller unit (MCU) and/or dual port power delivery (PD) controller 626 configured to route power through the cover 600 and between the first electrical connector 604, expansion hub 602, the accessory mount connectors 620, 622, 624, and the second electrical connection 628. The second electrical connection 628 can also be connected to the USB hub 606 for data routing through the stand 630 to the first electrical connector 604. As discussed above, the stand 630 can include a connector 632 to an external power source 634 or to connectable devices in or on the stand, such as by a USB receptacle 636. In an example embodiment, the external power source 634 can provide about 5-15 watts of power to the system per accessory device used, about 30 watts for the electronic device, and about 50 watts total in a typical implementation. When the external power source 634 is disconnected or turned off, power from an internal battery of the electronic device can be routed to the accessory devices and expansion hub via the USB plug 604. Furthermore, if an accessory includes an energy storage device (e.g., external battery), power from that device can be routed to other devices using the USB hub 606 and controller 626. High voltage or wattage can be provided to the electronic device while accessory devices are afforded less voltage or wattage, such as 15 volts to the electronic device and 5 volts to the accessory devices.

An accessory device 638 can include its own microcontroller unit 640 in electronic communication with a connector 642 attachable to one or more of the accessory mounts 620, 622, 624. The accessory device 638 can have its own input or output device 644, such as, for example, a Bluetooth low energy (BLE) transceiver for wireless communications with other devices (e.g., the electronic device 104 or other accessories). In some embodiments, an authentication coprocessor 646 can be included with the accessory device for key-based encryption and device authentication. These electronic components of the accessory device can electrically connect to a mount (e.g., 624) to enable their operation via a port (e.g., 614).

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. An expansion hub for a portable electronic device, the expansion hub comprising:
   a housing having a rear side;
   a first electrical connector to connect to an electronic device;
   a second electrical connector on the rear side of the housing and configured to mate to a third electrical connector in a rear direction relative to the housing, the second electrical connector being in electrical communication with the first electrical connector; and
   a mounting connector to mate the housing to a second mounting connector positioned external to the rear side of the housing in response to movement of the housing in the rear direction;
   wherein with the mounting connector mated to the second mounting connector, the second electrical connector is in electrical communication with the third electrical connector.

2. The expansion hub of claim 1, wherein:
   the housing is configured to enclose a rear surface of the electronic device;
   the first electrical connector is configured to engage the electronic device in a direction perpendicular to the rear direction;
   the mounting connector is configured to mate to the second mounting connector using a biased latch; and
   the second electrical connector is configured to mate to the third electrical connector using at least one biased pin.

3. The expansion hub of claim 1, wherein the housing is positioned in a cover configured to enclose a rear side of the electronic device.

4. The expansion hub of claim 3, wherein the cover comprises a rear casing and a front casing, the housing being positioned between the rear casing and the front casing.

5. The expansion hub of claim 3, wherein the housing is reversibly removable from the cover.

6. The expansion hub of claim 1, wherein the mounting connector comprises a magnetic component to magnetically attract the mounting connector to the second mounting connector.

7. The expansion hub of claim 1, further comprising a device hub and an accessory electrical connector;
   wherein the first electrical connector, the second electrical connector, and the accessory electrical connector are configured for electrical communication with each other by the device hub.

8. The expansion hub of claim 6, wherein the accessory electrical connector is positioned peripherally external to the housing.

9. The expansion hub of claim 6, further comprising an accessory device movable relative to the accessory electrical connector between a first position electrically connected to the accessory electrical connector and a second position electrically disconnected from the accessory electrical connector.

10. The expansion hub of claim 1, wherein the first electrical connector is configured to connect to the electronic device along a direction perpendicular to the rear direction.

11. A modular electronic device system, comprising:
    a case for an electronic device, the case including:
        a first case electrical connector to engage an electrical contact of the electronic device;
        a second case electrical connector facing a rear direction from the case and in electrical communication with the first case electrical connector;
        a third case electrical connector in electrical communication with the second case electrical connector;
        a first case latching portion; and
        a second case latching portion;
    a support base including:
        an arm portion having an arm latching portion releasably connectable to the first case latching portion;
        a first base electrical connector to connect to a power source;
        a second base electrical connector positioned on the arm portion and in electrical communication with the first base electrical connector; and
    an accessory device including:
        an accessory latching portion releasably connectable to the second case latching portion; and
        an electronic component configured to electrically connect to the third case electrical connector.

12. The modular electronic device system of claim 11, further comprising a device adapter including:
    a housing having a front side and a rear side;
    a first adapter electrical connector on the front side and configured to electrically engage the second case electrical connector;
    a second adapter electrical connector on the rear side and configured to electrically engage the second base electrical connector; and
    an accessory port for providing electrical communication with at least one of the first and second adapter electrical connectors.

13. The modular electronic device system of claim 12, wherein the device adapter is positionable between the case and the support base with the first adapter electrical connector electrically engaging the second case electrical connector and with the second adapter electrical connector electrically engaging the second base electrical connector.

14. The modular electronic device system of claim 11, wherein the first case latching portion is configured to blind-mate with the arm latching portion by movement of the first case latching portion parallel to the rear direction.

15. The modular electronic device system of claim 11, further comprising a sensor to detect attachment of the case to the support base.

16. The modular electronic device system of claim 11, wherein:
the first case latching portion and the arm latching portion are adjustable between a locked state and an unlocked state;
in the locked state, the case is locked to the arm portion; and
in the unlocked state, the case is suspended by the arm portion with the rear direction being substantially horizontal.

17. A tablet computing system, comprising:
a computing device having a touchscreen interface positioned in a housing and having an input port;
a cover configured to enclose at least a rear surface of the housing;
a hub positioned in the cover, the hub including a first electrical connector connected to the input port of the computing device and a second electrical connector exposed at an edge of the cover, wherein an accessory device is electrically connectable to the input port via contact with the second electrical connector.

18. The tablet computing system of claim 17, further comprising a mechanical connection interface at the second electrical connector, the mechanical connection interface being attachable to the accessory device.

19. The tablet computing system of claim 17, wherein the second electrical connector is configured to provide power to the accessory device.

20. The tablet computing system of claim 17, wherein the cover further comprises a panel positioned between the computing device and the hub.

\* \* \* \* \*